(12) United States Patent
Aratani

(10) Patent No.: US 10,970,807 B2
(45) Date of Patent: Apr. 6, 2021

(54) INFORMATION PROCESSING APPARATUS AND STORAGE MEDIUM

(71) Applicant: CANON KABUSHIKI KAISHA, Tokyo (JP)

(72) Inventor: Shinichi Aratani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/579,493

(22) Filed: Sep. 23, 2019

(65) Prior Publication Data

US 2020/0104969 A1 Apr. 2, 2020

(30) Foreign Application Priority Data

Sep. 28, 2018 (JP) .............................. JP2018-184795

(51) Int. Cl.
*G06T 1/20* (2006.01)
*G06T 11/00* (2006.01)
*G06T 7/73* (2017.01)

(52) U.S. Cl.
CPC .................. *G06T 1/20* (2013.01); *G06T 7/73* (2017.01); *G06T 11/00* (2013.01); *G06T 2200/28* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 6,741,790 B1* | 5/2004 | Burgess | ................. | G01C 11/00 386/227 |
| 7,456,833 B1* | 11/2008 | Diard | .................... | G06T 11/206 345/440 |
| 9,978,180 B2* | 5/2018 | Margolis | ............. | H04N 19/139 |
| 2006/0004280 A1 | 1/2006 | Kotake | | |

FOREIGN PATENT DOCUMENTS

JP 4532982 B2 8/2010

* cited by examiner

*Primary Examiner* — Robert J Craddock
(74) *Attorney, Agent, or Firm* — Canon U.S.A., Inc. IP Division

(57) ABSTRACT

An information processing apparatus includes an obtainment unit configured to obtain an image from an image capturing apparatus, a selection unit configured to select either of an estimation accuracy priority mode which prioritizes estimation accuracy of at least either one of a position and an orientation of the image capturing apparatus over a frame rate, and a frame rate priority mode which prioritizes the frame rate over the estimation accuracy, an estimation unit configured to estimate at least either one of the position and the orientation of the image capturing apparatus based on a feature of the image according to the mode selected by the selection unit, and a control unit configured to cause a display unit to display an image based on at least either one of the estimated position and the estimated orientation of the image capturing apparatus.

20 Claims, 3 Drawing Sheets

INFORMATION PROCESSING APPARATUS AND STORAGE MEDIUM

BACKGROUND

Field of the Disclosure

The present disclosure relates to an information processing apparatus and a storage medium.

Description of the Related Art

A mixed reality (MR) technology and an augmented reality (AR) technology are known as technologies for merging a virtual world into a real world in real time. These technologies are technologies for seamlessly merging virtual spaces generated by computers and real spaces. These technologies are expected to find applications in various fields, such as assembly support by superimposingly displaying work procedures or a state of wiring at the time of assembly work, and operation support by displaying and superimposing conditions inside bodies on a body surface of the patient bodies.

One major issue which has to be solved to realize the MR technology is positioning. In order that a user feels that a virtual object exists in the real space, it is preferred that the virtual object and the real space are geometrically consistent with each other. In other words, the virtual object should be constantly observable by the user as if the virtual object exists at a position where the virtual object is expected to exist in the real space.

A video see-through type information processing apparatus is one of apparatuses for causing an observer to feel that a virtual object exists in the real space. The video see-through type information processing apparatus captures an image of a real world by a video camera, displays a composite image obtained by superimposing a virtual object on the captured image on a display unit in real time, and presents the composite image to the observer. Generally, a portable information terminal, called a tablet terminal, which has a video camera on a rear surface thereof and a video see-through head mounted display (HMD) to be mounted on a head are used as the above-described information processing apparatus.

In the MR using the video see-through HMD, every time an image is input from a camera incorporated in the HMD, a position and an orientation of the camera in the real space at the time of image capturing is measured. Then, processing is generally performed to render computer graphics (CG) based on the position and orientation of the camera and on an intrinsic parameter of the camera, such as a focal length, and by displaying the CG by superimposing the CG on an image of the real space. Therefore, in the case of the MR using the video see-through HMD, the positioning is an issue about measurement of the position and orientation of the camera incorporated in the HMD in the real space.

The position and orientation of the camera can be measured by a physical sensor of a six degree of freedom, such as a magnetic sensor, an ultrasonic sensor, and an optical sensor. In addition, in a case where the video see-through HMD is used, image information from the camera incorporated in the video see-through HMD can be used for positioning. A positioning method using image information is widely used because the method is easier and cheaper than a method using the physical sensor. According to the positioning method using image information, an image of an index of which a three-dimensional position in the real space is known is captured by the camera, and the position and orientation of the camera are estimated based on correspondence between a position of the index in the captured image and the three-dimensional position of the index. The known index may be an index artificially arranged in the real space. For example, a square marker, a circular marker, and a point marker are used. According to Japanese Patent No. 4532982, arrangement information about the point marker and the square marker are estimated from an image with high accuracy.

Alternatively, without using the known index, in order to measure a position and an orientation of a camera, natural features, such as an edge and a salient point which have a luminance gradient, are detected in a captured image, and the position and orientation of the camera are estimated based on the natural features. According to the first method, a feature point is detected as the natural feature from an image. By moving a camera, a feature point is two-dimensionally tracked from a feature point detected in an initial image, and eight-by-eight pixel patches in the vicinity of the feature point are associated with each other between two images-namely the initial image and a current image. A position as three-dimensional information about a feature point group associated with relative position and orientation of the camera which has captured the two images is estimated from a corresponding point on an image coordinate. In this regard, the position as the three-dimensional information about the feature point group and an image patch in the vicinity thereof are collectively referred to as a map. Further, a map calculated from the initial two images is referred to as an initial map. The calculated map (the feature point group including the three-dimensional information in this case) is projected on an image plane based on the current position and orientation of the camera, and the position and orientation of the camera are updated so as to minimize an error between the detected feature point and the projected feature point. An image referred to as a key frame is obtained from a moving image when the position and orientation of the camera are estimated, and the feature point is sufficiently estimated. The feature point detected from each key frame is searched on an epipolar line and associated with each other. The position and orientation of the camera in each key frame and the three-dimensional position of the feature point group are subjected to bundle adjustment in order to minimize a projection error on each key frame, and a map is calculated with high accuracy by nonlinear optimization calculation.

According to the second method, a group of points having luminance gradients is densely detected as natural features from an entire image. The method and the first method are used for generation of the initial map. After generation of the initial map, the position and orientation are updated so that a luminance value of the point on the map in a key frame coincides with a luminance value thereof in a current frame when the point on the map is projected on a current image. When the position is separate more than a threshold value away from a previous key frame, a next key frame is added. The point on the map in a near key frame is searched in the added key frame on the epipolar line and the points are associated with each other. Depth information of the point on the map in the current key frame is estimated based on relative position and orientation and correlation information between two key frames. According to the second method, the image information about the key frame, the depth information about the point having the luminance gradient in the key frame, and the position and orientation of the key frame are collectively referred to as a map. If a key frame is added successively, an error is accumulated, so that optimization of the map is performed to realize consistency of the entire map.

The first method and the second method are techniques referred to as simultaneous localization and mapping (SLAM). The SLAM is a method for simultaneously performing localization to estimate the own position and orientation of a camera, and mapping to estimate a position of a feature point.

Real-time processing according to the present disclosure means performing the processing on an image obtained at a frame rate of a camera and performing rendering in time for an update rate of a display such as an HMD. Generally, processing operated in 60 to 120 fps is referred to as real-time processing.

The third method uses a filter referred to as an extended Kalman filter (EKF) and estimates a position and an orientation based on a prediction. The third method performs the real-time processing by quickly outputting a prediction result with the EKF.

In order to walk around in a real environment, it is necessary to detect a natural feature in a movement destination in a case where the natural feature described in Japanese Patent No. 4532982 is used, and thus the environment is required to include many natural feature points so that the feature points can be detected from any position and any angle. If many natural features are detected, image processing takes time, and a frame rate is reduced.

In the first method in which a method for handling patch information in the vicinity of a salient point detected in an image as the natural feature is used, processing takes time if a very large number of natural features is detected depending on an environment. Thus, a frame rate is reduced.

The second method for densely using points in which a luminance gradient can be detected is applicable to more environments than the first method since the method can use a lot of features compared with a method for detecting a salient point as the natural feature like the first method. However, if an environment includes a lot of fine patterns, the processing may take time depending on the environment, and a frame rate is reduced.

In order to estimate a position and an orientation of a camera with stability, it is desirable to detect an index and a natural feature from a wide range of area, so that an angle of view of a camera used for estimation may be set to a wide field angle in some cases. However, in a case of an environment in which many indices are arranged and fine patterns and objects are included, if an image is captured by a camera having a wide field angle, the processing takes time since many indices and natural features are detected, and a frame rate is reduced.

In a case where a natural feature is detected from a high-resolution image to perform estimation with high accuracy, a processing load is increased compared with a low-resolution image, so that the processing takes time, and real-time processing cannot be performed in some cases.

In a case where the EKF is used to perform the real-time processing, accuracy is generally reduced since a prediction result is put to use. In addition, in a case where a low-resolution image is used, or a number of feature points to be handled is reduced to perform the real-time processing, estimation accuracy of a position and an orientation of a camera is reduced compared with a case where a high-resolution image and many feature points are used.

SUMMARY

Various embodiments are directed to reduction of a defect which is caused by a reduced frame rate and reduced estimation accuracy of at least either one of a position and an orientation of a camera (an image capturing apparatus) in an apparatus which displays an image to an observer.

An information processing apparatus according to some embodiments includes an obtainment unit configured to obtain an image from an image capturing apparatus, a selection unit configured to select either of an estimation accuracy priority mode which prioritizes estimation accuracy of at least either one of a position and an orientation of the image capturing apparatus over a frame rate, and a frame rate priority mode which prioritizes the frame rate over the estimation accuracy, an estimation unit configured to estimate at least either one of the position and the orientation of the image capturing apparatus based on a feature of the image according to the mode selected by the selection unit, and a control unit configured to cause a display unit to display an image based on at least either one of the estimated position and the estimated orientation of the image capturing apparatus.

Further features of various embodiments will become apparent from the following description of exemplary embodiments with reference to the attached drawings.

DESCRIPTION OF THE EMBODIMENTS

Various exemplary embodiments will be described in detail below with reference to the attached drawings.

According to a first exemplary embodiment, a user wears a head mounted display (hereinbelow, an HMD) and observes computer graphics (CG). A position or an orientation (hereinbelow, referred to as position and orientation) of an image capturing apparatus is estimated in time for an update rate of the image capturing apparatus or a display, and the CG is rendered based on the estimated position and orientation. A composite image obtained by combining the CG and an image captured by the image capturing apparatus is displayed on the HMD that a user wears. In the following disclosure, the position and orientation means a set of six parameters including three parameters indicating a position and three parameters indicating an orientation (direction).

An information processing apparatus according to the first exemplary embodiment detects a feature point from an image captured by an image capturing apparatus using a method for estimating a position and an orientation obtained by the image capturing apparatus. Further, the information processing apparatus estimates the position and orientation of the image capturing apparatus based on the feature point. In order to provide a user with a comfortable mixed reality, the following user's movement is prioritized by switching to a frame rate priority mode in a case where the user moves quickly. On the other hand, in a case where the user thoroughly observes an overlapping state of a physical object and a virtual object in a low-speed motion, the mode is switched to an estimation accuracy priority mode.

Figure 3:
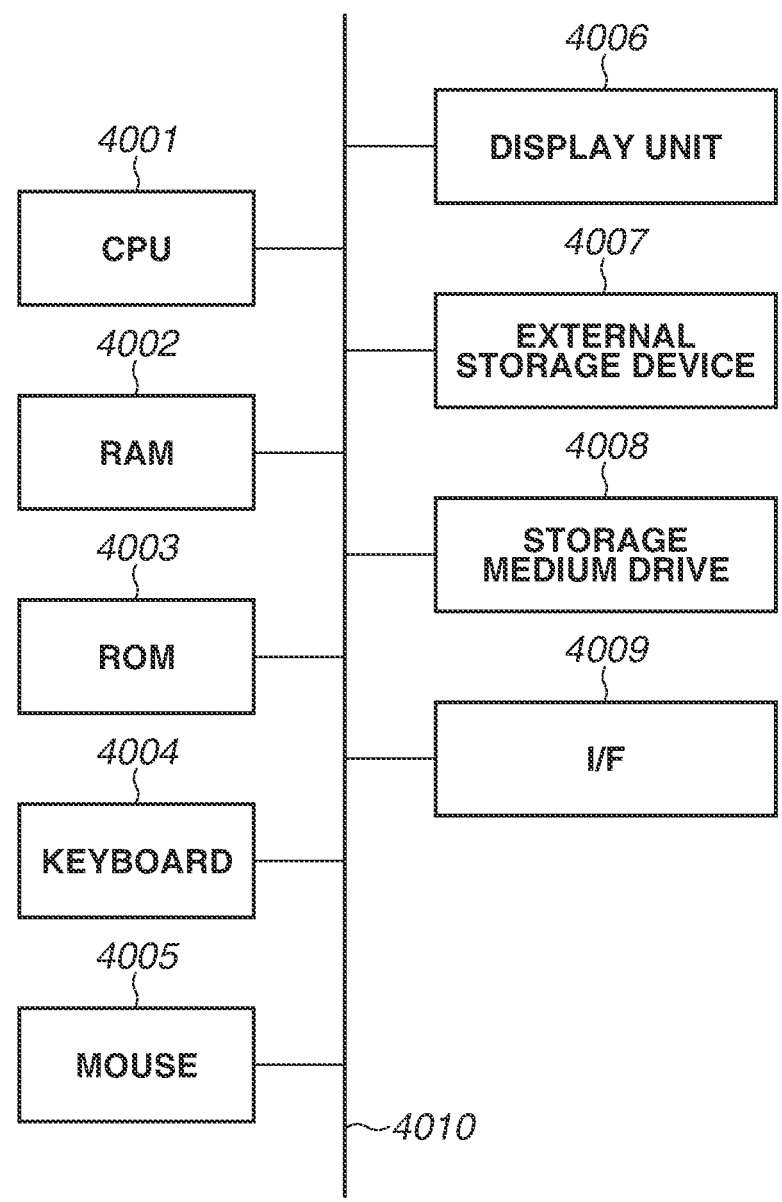
FIG. 3 illustrates an example of a hardware configuration according to the first exemplary embodiment.

FIG. 3 is a hardware configuration diagram of an information processing apparatus 1000 according to the present exemplary embodiment. In FIG. 3, a central processing unit (CPU) 4001 comprehensively controls each device connected via a bus 4010. The CPU 4001 reads a processing step and a program stored in a read-only memory (ROM) 4003 and executes the processing step and the program. Various processing programs and device drivers, including an operating system (OS), according to the present exemplary embodiment are stored in the ROM 4003. The programs and device drivers are temporarily stored in a random access memory (RAM) 4002 and appropriately executed by the CPU 4001. A keyboard 4004 and a mouse 4005 functioning as an input interface (I/F) receive an input signal from an input device (such as an operation device) in a format which can be processed by the information processing apparatus 1000. An output I/F 4009 outputs an output signal to an external device (such as a display unit 4006, an external storage device, and storage medium drive 4008) in a format which can be processed by the display device.

Figure 1:
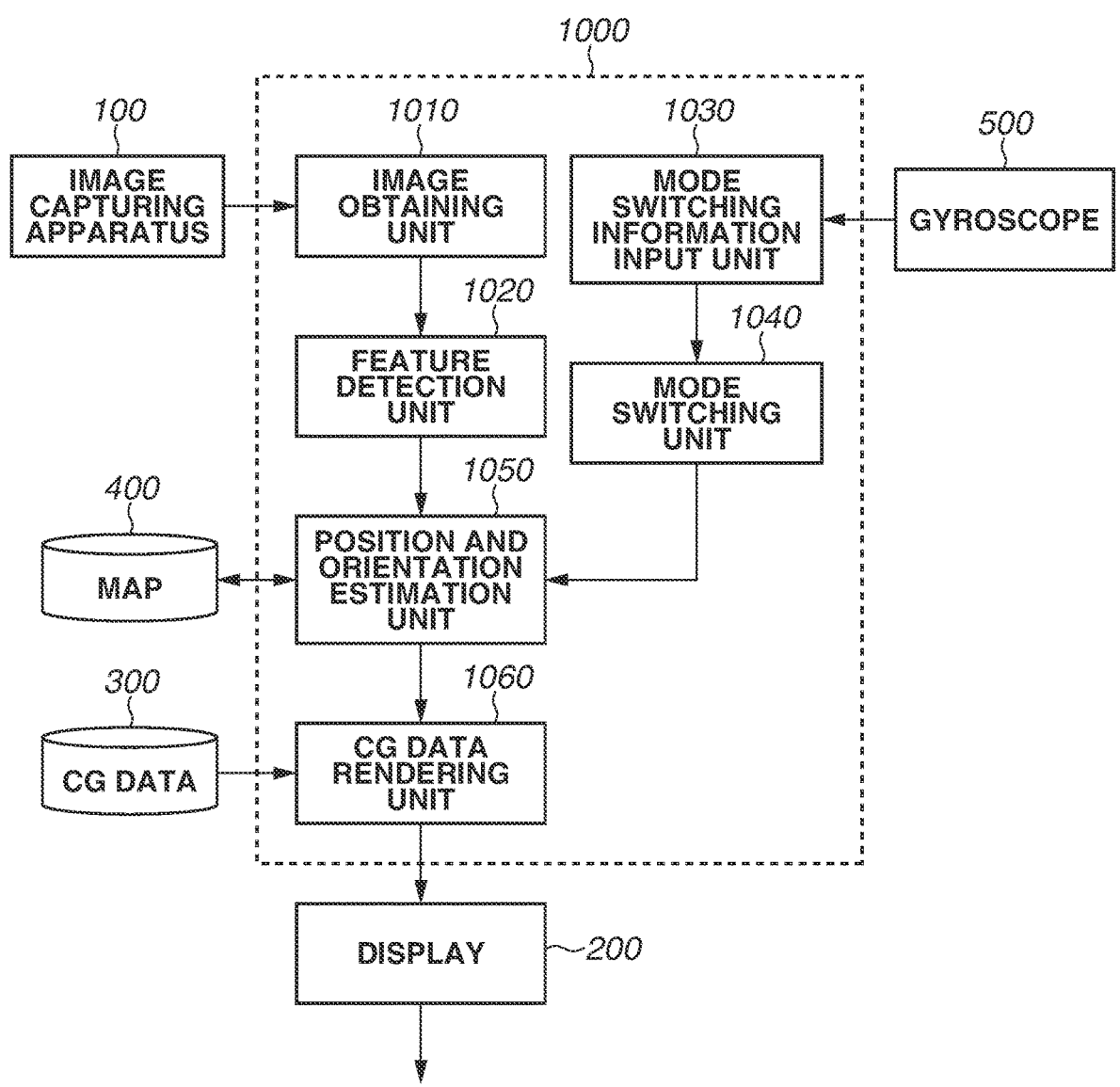
FIG. 1 is a functional block diagram illustrating a configuration of an information processing apparatus according to a first exemplary embodiment.

FIG. 1 is a configuration of the information processing apparatus 1000 according to according to the present exemplary embodiment.

The information processing apparatus 1000 includes an image obtaining unit 1010, a feature detection unit 1020, a mode switching information input unit 1030, a mode switching unit 1040, a position and orientation estimation unit 1050, and a CG data rendering unit 1060.

The information processing apparatus 1000 is connected to an image capturing apparatus 100 and a display 200. According to the present exemplary embodiment, the information processing apparatus 1000 is connected to the image capturing apparatus 100 and the display 200 in a wired or wireless manner.

The image capturing apparatus 100 is incorporated in or mounted outside an HMD, which is worn on a head of a user. For example, a video camera and a digital camera which continuously capture a moving image as a frame image are used as the image capturing apparatus 100.

The display 200 is an HMD and displays CG data rendered by the CG data rendering unit 1060. The display 200 may be a liquid crystal display or an organic electroluminescent (EL) display and may be in any configuration as long as the display can display an image combined with the CG.

The image obtaining unit 1010 continuously obtains images captured by the image capturing apparatus 100. In a case where the image capturing apparatus 100 has a digital output in a Universal Serial Bus (USB) format, an Institute of Electrical and Electronics Engineers (IEEE) 1394 format, and the like, the image obtaining unit 1010 is realized by, for example, a USB interface board and an IEEE 1394 interface board. In a case where the image capturing apparatus 100 outputs data in an analog fashion in a National Television System Committee (NTSC) format and the like, the image obtaining unit 1010 is realized by an analog video capture board. Alternatively, digital data of a still image or a moving image stored in a storage device in advance may be read. The obtained image is input to the feature detection unit 1020.

The feature detection unit 1020 detects a feature from each of images continuously obtained by the image obtaining unit 1010. A feature point having a luminance gradient is detected as a feature according to the present exemplary embodiment. The processing is described in detail below. The feature detection unit 1020 outputs a feature to be used, to the position and orientation estimation unit 1050, detecting a predetermined number of features as an upper limit or regarding a predetermined number L of features as the upper limit.

The mode switching information input unit 1030 receives acceleration or an angular velocity which are measurement values of a gyroscope 500 as mode switching information and outputs the mode switching information to the mode switching unit 1040.

The mode switching unit 1040 switches between the frame rate priority mode and the estimation accuracy priority mode, which are modes for estimating the position and orientation of the image capturing apparatus 100 based on the mode switching information input from the mode switching information input unit 1030. The mode switching unit 1040 outputs the switched mode to the position and orientation estimation unit 1050. A mode switching method is described in detail below.

The position and orientation estimation unit 1050 estimates the position and orientation of the image capturing apparatus 100 (derivation of position and orientation) based on the feature input from the feature detection unit 1020 and a map 400. An estimation method is described in detail below. The position and orientation estimation unit 1050 outputs the estimated position and orientation of the image capturing apparatus 100 to the CG data rendering unit 1060. The position and orientation estimation unit 1050 outputs a generated map to the map 400 to update the map.

A CG data storage unit 300 stores CG data to be rendered. The CG data may be in any format as long as it can be rendered as a CG image.

The CG data rendering unit 1060 obtains the CG data to be rendered from the CG data storage unit 300, sets the position and orientation of the image capturing apparatus 100 output from the position and orientation estimation unit 1050 as a position and an orientation of a virtual camera, and renders the CG data. The CG data rendering unit 1060 renders a composite image, combining and superimposing the CG data on an image obtained by the image capturing apparatus 100 and presents the composite image to a user. Thus, the mixed reality can be realized. In a case where the CG data rendering unit 1060 renders only the CG data, virtual reality can be realized.

The CG data rendering unit 1060 outputs the composite image to the display 200 (performs display control).

Each of the above-described function units is realized by the CPU 4001 developing a program stored in the ROM 4003 in the RAM 4002 and executing processing according to each flowchart described below. Further, for example, in a case where hardware is configured in place of software processing using the CPU 4001, a calculation unit and a circuit may be configured corresponding to processing performed by each of the above-described function units.

According to the present exemplary embodiment, a coordinate system for defining the position and orientation of the image capturing apparatus 100 (a coordinate system in which a point within an environment is defined as a point of origin, and three axis perpendicularly crossing each other are defined as X axis, Y axis, and Z axis in this case) is referred to as a world coordinate system. The world coordinate system may be defined based on a plurality of features of which positions are known under the environment. Alternatively, the world coordinate system may be defined based on a position and an orientation at which the image capturing apparatus 100 captures an image for the first time, and a position of each vertex forming indices respectively arranged within the environment, may be known. A scale may be determined based on the features and the indices of which positions are known. Alternatively, a scale of the world coordinate system may be determined based on known image capturing positions in a case where images are captured in a plurality of points.

According to some embodiments, camera internal parameters, such as a distortion correction coefficient, a focal length, and a principal point position of the image capturing apparatus 100, are already corrected using a known method.

Figure 2:
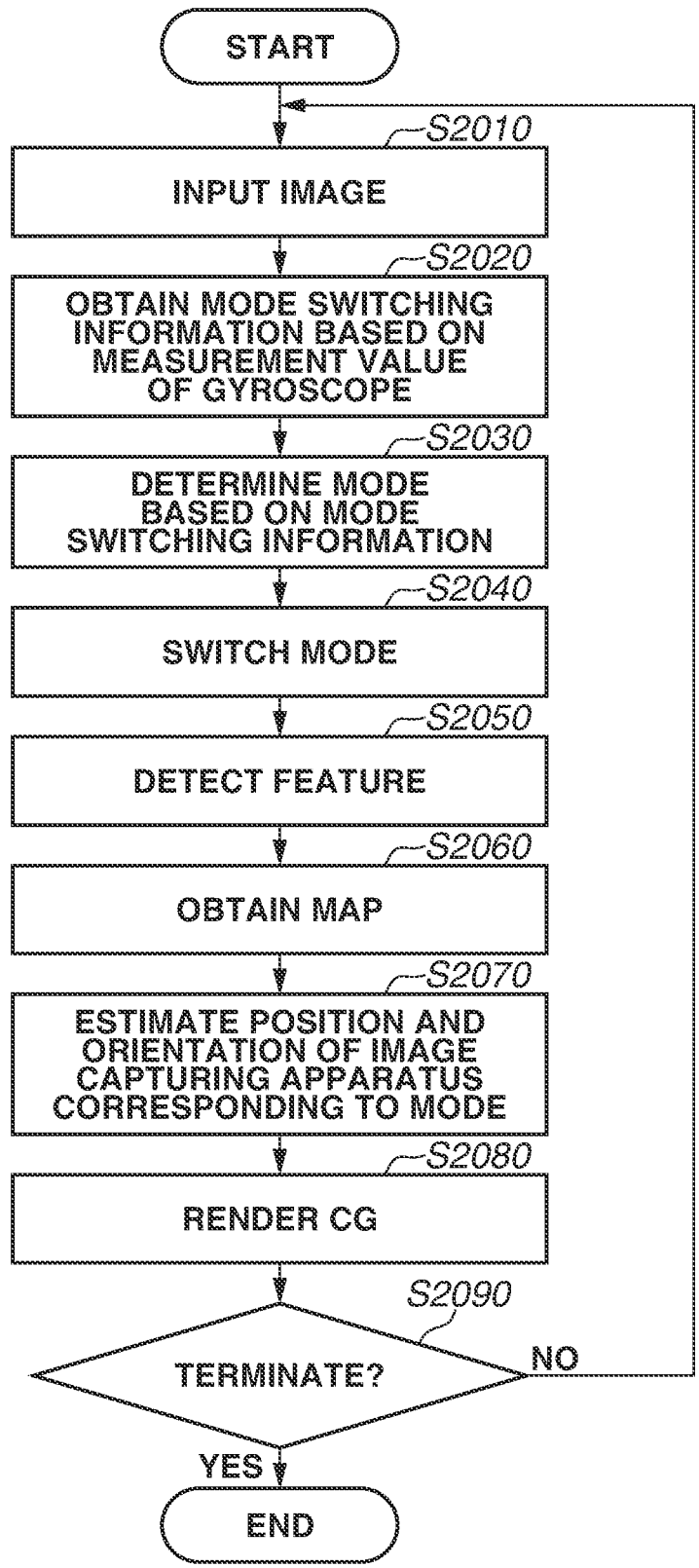
FIG. 2 is a flowchart illustrating processing procedures of the information processing apparatus according to the first exemplary embodiment.

Next, processing procedures of the information processing apparatus 1000 according to the first exemplary embodiment are described. FIG. 2 is a flowchart illustrating the processing procedures of the information processing apparatus 1000 according to the first exemplary embodiment.

In S2010, the image obtaining unit 1010 obtains an image captured by the image capturing apparatus 100.

In S2020, the mode switching information input unit 1030 obtains acceleration $A_t$ or an angular velocity $\omega_t$, which are measurement values of the gyroscope 500.

A formula (1) is given as follows, where t−1 is a frame number at a time when an image of a previous frame is obtained, and where $V_t$ is a velocity at a frame t.

[Formula 1]

$$V_t = \int_{t-1}^{t} A dt \quad \text{(Formula 1)}$$

The mode switching information input unit 1030 outputs the velocity $V_t$ or the angular velocity $\omega_t$ as the mode switching information. In S2030, in a case where the velocity $V_t$ as the mode switching information is greater than a threshold value $V_{Th}$ or the angular velocity $\omega_t$ is greater than a threshold value wan, the mode is determined to be the frame rate priority mode because a user is moving quickly. On the other hand, in another case, the mode is determined to be the estimation accuracy priority mode because the user is moving slowly.

In S2040, the mode is switched to the one determined in S2030, and the determined mode is set to the position and orientation estimation unit 1050.

In S2050, the feature detection unit 1020 performs feature detection on the image obtained in S2010. The feature detection is to detect an image coordinate of a feature point within an image. Processing for detecting a feature point from an image is described. A point having a luminance gradient greater than or equal to a threshold value between neighboring pixels is regarded as the feature point. The luminance gradient is a variation in density of pixels adjacent to each other in the image, and a point at which the luminance gradient changes at greater speed than or equal to the threshold value is regarded as the feature point. The luminance gradient is detected using a known edge detection operator, such as a Sobel operator and a Prewitt operator. The edge detection operator is applied to each pixel in a horizontal direction and a perpendicular direction of the image. Subsequently, an edge strength is calculated based on the output value. An edge strength I of a pixel is calculated using formula (2), where $f_x$ is an output value in the horizontal direction and $f_y$ is an output value in the perpendicular direction of the edge detection operator.

$$I = \sqrt{(f_x^2 + f_y^2)} \quad \text{(Formula 2)}$$

In S2060, the position and orientation estimation unit 1050 obtains the map 400 corresponding to the feature. According to the present exemplary embodiment, the map 400 corresponding to the feature is stored, associating a depth value of the feature point detected from each of a plurality of images with the position and orientation of the image capturing apparatus 100 at the time when the respective images are captured. The depth value of the feature point can be estimated by, for example, associating coordinates on the image with each other. For example, the feature point is tracked from images captured while changing positions in time series using a Kanade-Lucas-Tomasi (KLT) feature tracking method, and the feature points among a plurality of images are associated with each other. A transformation matrix, referred to as an E matrix (a fundamental matrix), is estimated from correspondence of the calculated feature points among the plurality of images. The position and orientation of the image capturing apparatus 100 are calculated from the E matrix, and a position of the feature point or the three-dimensional information about the depth is estimated by a stereo method based on the relative position and orientation among the plurality of images. The depth value of the feature point estimated as the map 400 may be a three-dimensional position in the world coordinate system or a depth value from a position captured by each image capturing apparatus 100. In the patent specification, each image used for estimating a map is referred to as a key frame.

In addition, feature points (natural feature points) respectively having different texture features may be regarded as features. In this case, the feature is detected from an image by performing template matching on the image using a template image of each feature stored as known information in advance. Further, an identifiable feature having an identifier may be used as with a scale-invariant feature transform (SIFT) feature. Any feature may be used without being limited to the above-described features as long as a feature is fixed in a space and can be detected from a captured image.

In S2070, the position and orientation estimation unit 1050 estimates the position and orientation of the image capturing apparatus 100 based on the feature point detected in S2050, the map obtained in S2060, and the mode switched in S2040.

In the case of the frame rate priority mode, the position and orientation estimation unit 1050 estimates the position and orientation of the image capturing apparatus 100 using prediction performed through an extended Kalman filter (EKF) so as to match an image capturing frame rate. The position and orientation estimation unit 1050 calculates a prior internal state of the EKF at a time t using a difference Δt between a frame t−1 at a time when a previous frame is processed and the frame t at a time when a current image is obtained and a posterior internal state of the EKF in the frame t−1. Any known method may be used as long as the position and orientation of the image capturing apparatus 100 are estimated so as to match the image capturing frame rate by prediction.

In the case of the estimation accuracy priority mode, the position and orientation estimation unit 1050 estimates the position and orientation of the image capturing apparatus 100 with high accuracy by taking a longer time than the frame rate priority mode. Any known method may be used as long as the method is for estimating the position and orientation of the image capturing apparatus 100 with high accuracy by taking a longer time than the frame rate priority mode. Any known method may be used to estimate the position and orientation of the image capturing apparatus 100 based on the map as long as the method is performed to estimate the position and orientation of the image capturing apparatus 100 from the detected feature.

A method for estimating the position and orientation of the image capturing apparatus 100 based on the map is described. The feature point included in the map obtained in S2060 is projected to the image input in S2010. As the feature point to be projected, the feature point associated with the position and orientation nearest to the position and orientation of the image capturing apparatus 100 when a latest image is captured in time series may be selected and projected. The position and orientation of the image capturing apparatus 100 are estimated based on a luminance value around a position of the projected feature point in the image such that the luminance value of the projected feature point at the position coincides with the luminance value therearound.

The position and orientation of the image capturing apparatus 100 estimated by the position and orientation estimation unit 1050 is used for CG rendering as a view point of a virtual camera in the mixed reality and the virtual reality, so that the real-time processing is required in response to movement of a user. Therefore, after an initial map is generated, map generation with a high processing load and estimation of the position and orientation of the image capturing apparatus with a relatively low processing load are processed in parallel. The position and orientation estimation unit 1050 estimates the position and orientation of the image capturing apparatus 100 based on the feature and the map and then outputs an estimation result of the position and orientation of the image capturing apparatus 100 to the CG data rendering unit 1060.

In S2080, the CG data rendering unit 1060 obtains the CG data to be rendered from the CG data storage unit 300, sets the position and orientation of the image capturing apparatus 100 output from the position and orientation estimation unit 1050 as the position and orientation of the virtual camera, and renders the CG data. The CG data rendering unit 1060 renders a composite image by combining the CG data on the image obtained by the image capturing apparatus 100 and presents the composite image to a user so as to realize the mixed reality. In a case where the CG data rendering unit 1060 renders only the CG data, virtual reality can be realized.

In S2090, in a case where the processing is terminated (YES in S2090), the processing in the present flowchart is terminated, and in a case where the processing is continued (NO in S2090), the processing returns to S2010.

As described above, the mode for estimating the position and orientation of the image capturing apparatus 100 is determined to be the frame rate priority mode or to be the estimation accuracy priority mode according to the acceleration or the angular velocity, which are the measurement values of the gyroscope 500, and the position and orientation of the image capturing apparatus 100 are estimated by the processing corresponding to the determined mode. Accordingly, in a case where movement of a user is quick, the position and orientation are estimated without reducing the frame rate, so that the movement of the user can be quickly followed, and in a case where the movement of the user is slow to allow the user to thoroughly observe the object, the position and orientation can be output with high accuracy. In other words, the comfortable mixed reality can be provided by deciding whether to prioritize the frame rate or the high accuracy in response to movement of a user in a case where the position and orientation of the image capturing apparatus 100 are estimated.

Modification

According to the first exemplary embodiment, in the case of the frame rate priority mode, the position and orientation of the image capturing apparatus 100 are estimated using prediction like the EKF so as to match the image capturing frame rate. In the case of the frame rate priority mode, the mode switching unit 1040 may set a desired frame rate as an upper limit of the frame rate. According to a modification, a frame rate is set based on an update rate of the image capturing apparatus 100.

The position and orientation estimation unit 1050 improves an amount of information to achieve higher accuracy by increasing the number of feature points to handle in a case where processing can be performed without exceeding an upper limit of the frame rate. The position and orientation estimation unit 1050 allocates an extra processing time to processing for achieving higher accuracy while realizing the set upper limit of the frame rate. The upper limit of the frame rate is not limited to a setting based on an update rate of image capturing. The upper limit of the frame rate may be set by a user, and the update rate of the display may be set as the upper limit of the frame rate.

As described above, the upper limit of the frame rate is set, in such a manner that the processing is not performed at a frame rate that is more than necessary, and the position or the orientation of the image capturing apparatus can be estimated by taking time as much as possible, with high accuracy within a range corresponding the set frame rate. In other words, the comfortable mixed reality can be provided by performing the processing with high accuracy within a possible range while prioritizing the frame rate in a case where the position and orientation of the image capturing apparatus 100 are estimated.

According to the first exemplary embodiment, the mode is determined to be the frame rate priority mode or to be the estimation accuracy priority mode according to the acceleration or the angular velocity which are the measurement values of the gyroscope 500. The position and orientation of the image capturing apparatus 100 are estimated by the processing corresponding to the determined mode. However, the mode switching information for switching between the frame rate priority mode and the estimation accuracy priority mode is not limited to the one based on the acceleration or the angular velocity, which are the measurement values of the gyroscope 500.

According to a second exemplary embodiment, a variation in the position or the orientation in a past frame is processed as the mode switching information.

The mode switching information input unit 1030 inputs the variation in the position or the orientation in the past frame to the mode switching unit 1040 as the mode switching information. The present embodiment defines $P_{diff}$ as a position variation and $R_{diff}$ as an orientation variation between the frame t-1 at the primarily preceding time when the previous frame is processed and a frame t-2 at a secondarily preceding time when a frame before the previous frame is processed. In a case where the position variation $P_{diff}$ is greater than a threshold value $P_{Th}$, or the orientation variation $R_{diff}$ is greater than a threshold value $R_{Th}$, a user is moving quickly, so that a comfortable mixed reality experience is provided by increasing the frame rate. Thus, the mode is determined to be the frame rate priority mode. On the other hand, in another case, the mode is determined to be the estimation accuracy priority mode because the user is performing thorough observation.

Naturally, the frames are not necessarily to be fixed only between the frame t-1 and the frame t-2 as long as the variation is that of the position or the orientation in the past frame. A velocity V or an angular velocity ω may be calculated based on the position variation $P_{diff}$ or the orientation variation $R_{diff}$ and a time between the frames. In the case where the velocity V or the angular velocity ω is used, processing is similar to that according to the first exemplary embodiment.

As described above, the mode is determined to be the frame rate priority mode or to be the estimation accuracy priority mode based on the variation in the position or the orientation of the camera in the past frame, and the position and orientation of the image capturing apparatus 100 are estimated by the processing corresponding to the determined mode. In other words, the comfortable mixed reality can be provided by deciding whether to prioritize the frame rate or the high accuracy in response to movement of a user in a case where the position and orientation of the image capturing apparatus 100 are estimated.

According to the second exemplary embodiment, the mode is determined to be the frame rate priority mode or to be the estimation accuracy priority mode according to the variation in the position or the orientation of the camera in the past frame, and the position and orientation of the image capturing apparatus 100 are estimated by the processing corresponding to the determined mode. However, the mode switching information for switching between the frame rate priority mode and the estimation accuracy priority mode is not limited to the above-described one.

According to a third present exemplary embodiment, the mode is determined to be the frame rate priority mode or to be the estimation accuracy priority mode by recognizing a gesture.

The mode switching information input unit 1030 inputs a recognition result of an identifiable gesture to the mode switching unit 1040.

The mode switching unit 1040 identifies a hand of a person who wears the HMD from an image captured by the image capturing apparatus 100 mounted on the HMD and switches the mode to the frame rate priority mode if the hand is swiped from left to right. Further, the mode switching unit 1040 switches the mode to the estimation accuracy priority mode if the hand is swiped from right to left in the image captured by the image capturing apparatus 100. Any gesture can be used as long as the gesture is identifiable to switch between the two modes. For example, the mode may be switched by a gesture of raising one finger and a gesture of raising two fingers.

As described above, the gesture is used as the mode switching information, and the mode is determined to be the frame rate priority mode or to be the estimation accuracy priority mode according to the gesture. The position and orientation of the image capturing apparatus 100 are estimated by the processing corresponding to the determined mode. In other words, the mixed reality which matches a user's purpose can be provided by switching between the frame rate prioritization and the high accuracy prioritization according to a user's intention when the position and orientation of the image capturing apparatus 100 are estimated.

According to the third exemplary embodiment, the gesture is used as the mode switching information. The mode is determined to be the frame rate priority mode or to be the estimation accuracy priority mode according to the gesture, and the position and orientation of the image capturing apparatus 100 are estimated by the processing corresponding to the determined mode. However, the mode switching information for switching between the frame rate priority mode and the estimation accuracy priority mode is not limited to the above-described one.

According to a fourth exemplary embodiment, the mode is determined to be the frame rate priority mode or to be the estimation accuracy priority mode through recognizing of a voice.

The mode switching information input unit 1030 inputs identifiable voice recognition information to the mode switching unit 1040.

In a case where a user vocalizes "the frame rate priority mode", the mode switching unit 1040 determines that the frame rate priority mode has been indicated, using a known voice recognition technique. Further, in a case where the user vocalizes "the estimation accuracy priority mode", the mode switching unit 1040 determines that the estimation accuracy priority mode has been indicated, using the known voice recognition technique. Any voice can be used as long as the voice recognition information is identifiable to switch between the two modes.

As described above, the voice recognition information is used as the mode switching information, and the mode is determined to be the frame rate priority mode or to be the estimation accuracy priority mode according to the voice recognition information. The position and orientation of the image capturing apparatus 100 are estimated by the processing corresponding to the determined mode, and the mixed reality that matches the user's purpose can be provided.

According to the fourth exemplary embodiment, the voice recognition information is used as the mode switching information. The mode is determined to be the frame rate priority mode or to be the estimation accuracy priority mode according to the voice recognition information. The position and orientation of the image capturing apparatus 100 are estimated by the processing corresponding to the determined mode. However, the mode switching information for switching between the frame rate priority mode and the estimation accuracy priority mode is not limited to the above-described one.

According to a fifth present exemplary embodiment, the mode is determined to be the frame rate priority mode and the estimation accuracy priority mode according to a load status of the CPU.

The mode switching information input unit 1030 inputs the CPU load status to the mode switching unit 1040.

In a case where a CPU utilization ratio $Q_t$ is greater than a threshold value $Q_{Th}$, the mode switching unit 1040 switches to the frame rate priority mode. On the other hand, in a case where the CPU utilization ratio $Q_t$ is less than the threshold value $Q_{Th}$, the CPU has a margin, so that the mode switching unit 1040 switches to the estimation accuracy priority mode which takes a time to perform the processing and estimates the position and orientation of the image capturing apparatus 100 with high accuracy.

A load status of a frame CPU in the frame t at the time when the current image is obtained is expressed by the CPU utilization ratio Qt. In a case where the CPU utilization ratio $Q_t$ is greater than the threshold value $Q_{Th}$, the processing takes a time since a loading factor of the CPU is high, and there is a possibility that a processing time per frame cannot catch up with an update interval of image capturing.

As described above, the CPU load status can be used as the mode switching information. The mode is determined to be the frame rate priority mode or to be the estimation accuracy priority mode according to the CPU load status, and the position and orientation of the image capturing apparatus 100 are estimated by the processing corresponding to the determined mode. Accordingly, the comfortable mixed reality can be provided.

According to the first exemplary embodiment, in the case of the frame rate priority mode, the position and orientation of the image capturing apparatus 100 are estimated using a prediction like the EKF so as to match the image capturing frame rate. However, the processing is not limited to the above-described one as long as the frame rate is increased more than the estimation accuracy priority mode.

According to a sixth exemplary embodiment, the frame rate is increased by reducing the amount of information to be processed to less than the estimation accuracy priority mode.

A method for reducing the amount of information is described below.

Image resolution is reduced when the image obtaining unit 1010 obtains an image.

Resolution of the image input to the feature detection unit 1020 is lower than the estimation accuracy priority mode, so that the amount of information to be processed is reduced, and the processing can be performed at higher speed than in a case of high resolution.

The method is not limited to the one for reducing the resolution as long as the amount of information to be processed is reduced to less than that of the estimation accuracy priority mode. For example, the number of feature points to be detected by the feature detection unit 1020 may be reduced. Alternatively, in a case of a known technique using a key frame, the amount of information may be reduced by reducing the number of frames to be processed in the key frames stored in the map 400.

The amount of information may also be reduced by reducing parameters of image processing performed as pretreatment by the feature detection unit 1020. The amount of information is reduced by reducing a filter size as an image processing parameter of edge enhancement. The filter of the edge enhancement generally has a size of 5*5 and 3*3. Further, the amount of information may be reduced by reducing a filter size as an image processing parameter of noise reduction in the image processing performed as the pretreatment by the feature detection unit 1020. In the noise reduction processing, a smoothing filter and a Gaussian filter are generally used.

As described above, in the frame rate priority mode, the amount of information for estimating the position or the orientation of the image capturing apparatus 100 is reduced to less than the estimation accuracy priority mode, so that the frame rate can be brought close to a desired frame rate, and the comfortable mixed reality can be provided.

According to the first exemplary embodiment, the mode is determined to be the frame rate priority mode or to be the estimation accuracy priority mode based on the acceleration or the angular velocity, which are the measurement values of the gyroscope 500, and the position and orientation of the image capturing apparatus 100 are estimated by the processing corresponding to the determined mode. However, the mode switching information for switching between the frame rate priority mode and the estimation accuracy priority mode is not limited to the one based on the acceleration or the angular velocity, which are the measurement values of the gyroscope 500.

According to a seventh exemplary embodiment, an optical flow is processed as the mode switching information.

The mode switching information input unit 1030 inputs an optical flow which is a variation in a feature of an image from a past frame, to the mode switching unit 1040 as the mode switching information. The present exemplary embodiment defines $X_i$ as a variation in positions on the image between the frame t−1 at the primarily preceding time when the previous frame is processed and the frame t−2 at the secondarily preceding time when the frame before the previous frame is processed. A subscript "i" is an identifier of the feature for calculating the optical flow. In a case where the variation $X_i$ is greater than a threshold value $X_{Th}$ in a predetermined number of the features or more, it is determined that a user or an object to be imaged is moving quickly, so that the comfortable mixed reality experience is provided by increasing the frame rate. Thus, the mode is determined to be the frame rate priority mode. On the other hand, in another case, the mode is determined to be the estimation accuracy priority mode because the user is performing thorough observation.

Naturally, the frames are not to be fixed only between the frame t−1 and the frame t−2 as long as the variation in the position of the feature on the image is handled.

In addition, motion blur may be handled as the mode switching information as a variation in the position of the feature on the image in the frame t at a time when the image capturing apparatus 100 captures the image. Motion blur occurs if the image capturing apparatus 100 moves during exposure. A method for detecting motion blur may be any known method. In a case where a motion blur amount $M_i$ is greater than a threshold value $M_{Th}$ in a predetermined number of the features or more, it is determined that a user or an object to be imaged is moving quickly, so that the comfortable mixed reality experience is provided by increasing the frame rate. Thus, the mode is determined to be the frame rate priority mode. On the other hand, in another case, the mode is determined to be the estimation accuracy priority mode because the user performing thorough observation.

As described above, the mode is determined to be the frame rate priority mode or to be the estimation accuracy priority mode according to the optical flow, and the position and orientation of the image capturing apparatus 100 are estimated by the processing corresponding to the determined mode. In other words, the comfortable mixed reality can be provided by deciding whether to prioritize the frame rate or the high accuracy in response to movement of a user or an object when the position and orientation of the image capturing apparatus 100 are estimated.

According to the first exemplary embodiment, the mode is determined to be the frame rate priority mode or to be the estimation accuracy priority mode according to the acceleration or the angular velocity, which are the measurement values of the gyroscope 500, and the position and orientation of the image capturing apparatus 100 are estimated by the processing corresponding to the determined mode. However, the mode switching information for switching between the frame rate priority mode and the estimation accuracy priority mode is not limited to the one based on the acceleration or the angular velocity, which are the measurement values of the gyroscope 500.

According to an eighth exemplary embodiment, information input by a user from a user interface is processed as the mode switching information.

The mode switching information input unit 1030 inputs the information input by a user from the user interface to the mode switching unit 1040 as the mode switching information. The user interface may be a button or a checkbox, or any other user interfaces as long as the interface is a known user interface.

In a case where the frame rate priority mode is selected by the user interface, the mode switching unit 1040 determines that the mode is the frame rate priority mode. On the other hand, in a case where the estimation accuracy priority mode is selected by the user interface, the mode switching unit 1040 determines that the mode is the estimation accuracy priority mode.

As described above, the mode is determined to be the frame rate priority mode or to be the estimation accuracy priority mode according to the input information selected by the user using the user interface, and the position and orientation of the image capturing apparatus 100 are estimated by the processing corresponding to the determined mode. In other words, the comfortable mixed reality can be provided by deciding whether to prioritize the frame rate or the high accuracy based on a user's intention in a case where the position and orientation of the image capturing apparatus 100 are estimated.

According to the first exemplary embodiment, the mode is determined to be the frame rate priority mode or to be the estimation accuracy priority mode according to the acceleration or the angular velocity, which are the measurement values of the gyroscope 500, and the position and orientation of the image capturing apparatus 100 are estimated by the processing corresponding to the determined mode. If the frame rate is low when a user starts to move, a video image cannot catch up with the movement of the user who is wearing the HMD, and the user's risk of fall and collision is increased in a case where the user is moving while wearing the HMD.

Therefore, according to a ninth exemplary embodiment, the mode is determined to be the frame rate priority mode based on the acceleration or the angular velocity which are the measurement values of the gyroscope 500 when a user starts to move, and processing is performed to rapidly increase the frame rate.

The mode switching information input unit 1030 obtains the frame number t at the time when the image capturing apparatus 100 captures an image and the acceleration $A_t$ or the angular velocity $\omega_t$, which are the measurement values of the gyroscope 500, obtained at the approximately same time. A frame number is defined as $t_{delay}$ at a time obtained by adding an exposure time necessary for the image capturing apparatus 100 to perform exposure and a transfer time necessary for transferring the image to the information processing apparatus 1000. The gyroscope 500 performs operations at an update rate faster than the update rate of the image capturing apparatus 100 and obtains acceleration $A_{tdelay}$ or an angular velocity $\omega_{tdelay}$ which are the measurement values of the gyroscope 500 at the frame number $t_{delay}$.

A formula 3 is given as follows, where $V_{tdelay}$ is a velocity in the frame number $t_{delay}$ at a time when the image is obtained.

$$V_{tdelay} = \int_t^{tdelay} A dt. \quad \text{(Formula 3)}$$

The mode switching information input unit 1030 outputs the velocity $V_{tdelay}$ or the angular velocity $\omega_{tdelay}$ as the mode switching information.

In S2030, in a case where the velocity $V_{tdelay}$ as the mode switching information is greater than a threshold value $V_{Th'}$ or the angular velocity $\omega_{tdelay}$ is greater than a threshold value $\omega_{Th'}$, the mode is determined to be the frame rate priority mode because the user is rapidly moving.

The mode is determined to be the frame rate priority mode according to the acceleration or the angular velocity, which are the measurement values of the gyroscope 500, when a user starts to move. However, a sensor is not limited to the gyroscope. Any sensor which can obtain acceleration or an angular velocity at the time when a user starts to move can be used. An optical sensor and a magnetic sensor may be used.

As described above, a variation of user's movement in the same frame captured by the image capturing apparatus 100 is obtained using the gyroscope 500 having a high update rate and is treated as the mode switching information. Accordingly, if a user moves rapidly, the mode can be set to the frame rate priority mode without waiting a next frame. In other words, the safe and comfortable mixed reality can be provided by switching the mode to prioritize the frame rate in response to rapid user movement in a case where the position and orientation of the image capturing apparatus 100 are estimated.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-184795, which was filed on Sep. 28, 2018 and which is hereby incorporated by reference herein in its entirety.

What is claimed is:

1. An information processing apparatus comprising:
an obtainment unit configured to obtain frame images generated by capturing a video image at a predetermined frame rate by an image capturing apparatus;
a selection unit configured to select one of an estimation accuracy priority mode and a frame rate priority mode, wherein estimation of a position and an orientation of the image capturing apparatus in the estimation accuracy priority mode is more accurate than that in the frame rate priority mode, and a frame rate of processing the frame images in the frame rate priority mode is higher than that in the estimation accuracy priority mode;

an estimation unit configured to estimate the position and the orientation of the image capturing apparatus based on a feature of the image according to the mode selected by the selection unit; and a control unit configured to cause a display unit to display an image based on the estimated position and the estimated orientation of the image capturing apparatus.

2. The information processing apparatus according to claim 1, wherein estimation done by the estimation unit in the estimation accuracy priority mode takes a longer time in estimating at least either one of the position and the orientation of the image capturing apparatus than in the frame rate priority mode.

3. The information processing apparatus according to claim 1, wherein estimation done by the estimation unit in the estimation accuracy priority mode uses more features of the image than in the frame rate priority mode.

4. The information processing apparatus according to claim 1, wherein the selection unit selects one of the estimation accuracy priority mode and the frame rate priority mode based on a variation in at least either one of the position and the orientation of the image capturing apparatus.

5. The information processing apparatus according to claim 1, wherein the selection unit selects one of the estimation accuracy priority mode and the frame rate priority based on a variation in at least either one of the position and the orientation of the image capturing apparatus based on a measurement value of a gyroscope.

6. The information processing apparatus according to claim 1, wherein the selection unit selects one of the estimation accuracy priority mode and the frame rate priority mode based on a variation in at least either one of the position and the orientation of the image capturing apparatus based on voice information.

7. The information processing apparatus according to claim 1, wherein the selection unit selects either of the estimation accuracy priority mode and the frame rate priority mode based on a variation in at least either one of the position and the orientation of the image capturing apparatus based on gesture information.

8. The information processing apparatus according to claim 1, wherein, in a case where the frame rate priority mode is selected by the selection unit, the control unit sets an upper limit of the frame rate to an update rate of the image capturing apparatus or the display unit.

9. The information processing apparatus according to claim 1, wherein the selection unit selects one of the estimation accuracy priority mode and the frame rate priority mode based on a variation in at least either one of the position and the orientation of the image capturing apparatus based on information about a load on a central processing unit (CPU).

10. The information processing apparatus according to claim 1, wherein the selection unit selects one of the estimation accuracy priority mode and the frame rate priority mode based on a variation in at least either one of the position and the orientation of the image capturing apparatus, based on an optical flow or motion blur detected from the image.

11. The information processing apparatus according to claim 1, wherein a number of features of the image to be processed in the estimation unit is different between the estimation accuracy priority mode and the frame rate priority mode.

12. The information processing apparatus according to claim 1, wherein an image processing parameter in edge enhancement or noise reduction used in the estimation unit is different between the estimation accuracy priority mode and the frame rate priority mode.

13. The information processing apparatus according to claim 1, wherein the selection unit selects one of the estimation accuracy priority mode and the frame rate priority mode based on a selection input to a user interface by a user.

14. The information processing apparatus according to claim 1, wherein the selection unit selects one of the estimation accuracy priority mode and the frame rate priority mode based on movement of a user in the image obtained using a sensor having an update rate higher than that of the image capturing apparatus.

15. A method for processing information, the method comprising:

obtaining frame images generated by capturing a video image at a predetermined frame rate by an image capturing apparatus;

selecting one of an estimation accuracy priority mode and a frame rate priority mode, wherein estimation of a position and an orientation of the image capturing apparatus in the estimation accuracy priority mode is more accurate than that in the frame rate priority mode, and a frame rate of processing the frame images in the frame rate priority mode is higher than that in the estimation accuracy priority mode;

estimating the position and the orientation of the image capturing apparatus from a feature of the image based on the selected mode; and causing a display unit to display an image based on the estimated position and the estimated orientation of the image capturing apparatus.

16. The method according to claim 15, wherein the estimating in the estimation accuracy priority mode takes a longer time in estimating at least either one of the position and the orientation of the image capturing apparatus than in the frame rate priority mode.

17. The method according to claim 15, wherein the estimating in the estimation accuracy priority mode uses more features of the image than in the frame rate priority mode.

18. The method according to claim 15, wherein the selecting selects one of the estimation accuracy priority mode and the frame rate priority mode based on a variation in at least either one of the position and the orientation of the image capturing apparatus.

19. The method according to claim 15, wherein the selecting selects one of the estimation accuracy priority mode and the frame rate priority mode based on a variation in at least either one of the position and the orientation of the image capturing apparatus based on a measurement value of a gyroscope.

20. A non-transitory storage medium storing a program causing a computer to execute a method, the method comprising:

obtaining frame images generated by capturing a video image at a predetermined frame rate by an image capturing apparatus;

selecting one of an estimation accuracy priority mode and a frame rate priority mode, wherein estimation of a position and an orientation of the image capturing apparatus in the estimation accuracy priority mode is more accurate than that in the frame rate priority mode, and a frame rate of processing the frame images in the frame rate priority mode is higher than that in the estimation accuracy priority mode;

estimating the position and the orientation of the image capturing apparatus from a feature of the image based on the selected mode; and causing a display unit to display an image based on the estimated position and the estimated orientation of the image capturing apparatus.

\* \* \* \* \*